(12) United States Patent
Holmes (10) Patent No.: US 12,469,094 B2
(45) Date of Patent: Nov. 11, 2025

(54) SYSTEMS AND METHODS FOR TRAINING AND EVALUATION

(71) Applicant: TALON TACTICAL SYSTEMS LLC, Ramona, CA (US)

(72) Inventor: Tristan Holmes, San Diego, CA (US)

(73) Assignee: TALON TACTICAL SYSTEMS LLC, Ramona, CA (US)

( * ) Notice: Subject to any disclaimer, the term of this patent is extended or adjusted under 35 U.S.C. 154(b) by 0 days.

(21) Appl. No.: 18/131,117

(22) Filed: Apr. 5, 2023

(65) Prior Publication Data

US 2023/0237604 A1 Jul. 27, 2023

Related U.S. Application Data (63) Continuation of application No. 17/329,601, filed on May 25, 2021, now abandoned.

(60) Provisional application No. 63/192,447, filed on May 24, 2021, provisional application No. 63/030,918, filed on May 27, 2020.

(51) Int. Cl.
| | |
|---|---|
| *G06Q 50/20* | (2012.01) |
| *G06F 3/0482* | (2013.01) |
| *G06Q 10/0631* | (2023.01) |
| *G06Q 10/10* | (2023.01) |
| *G06Q 50/26* | (2024.01) |

(52) U.S. Cl.
CPC ... *G06Q 50/205* (2013.01); *G06Q 10/063114* (2013.01); *G06F 3/0482* (2013.01); *G06Q 10/10* (2013.01); *G06Q 50/26* (2013.01)

(58) Field of Classification Search
None
See application file for complete search history.

(56) References Cited

U.S. PATENT DOCUMENTS

| | | | | |
|---|---|---|---|---|
| 6,905,341 | B1 * | 6/2005 | Whitaker | G09B 5/08 434/323 |
| 8,754,924 | B1 * | 6/2014 | Shane | H04N 7/15 348/14.05 |
| 2002/0116649 | A1 * | 8/2002 | Goshima | H04L 63/0815 709/227 |
| 2006/0035206 | A1 * | 2/2006 | Clark | G06Q 10/0639 434/350 |
| 2008/0096181 | A1 * | 4/2008 | Rogers | G09B 7/02 434/362 |
| 2008/0133964 | A1 * | 6/2008 | Rogers | G06F 11/2294 714/E11.113 |
| 2009/0186328 | A1 * | 7/2009 | Robinson | G09B 5/14 434/350 |

(Continued)

*Primary Examiner* — Folashade Anderson
(74) *Attorney, Agent, or Firm* — CP Law Group PC; Cy Bates (57) ABSTRACT

Systems and related methods for a training protocol are described. The system and methods may include a graphical user interface where after selecting an evaluated trainee and an evaluated task, a score input region populates certain features associated with the evaluated trainee and the evaluated task, including a score region. Furthermore, the systems and methods may further include generating a training report which is configured to receive a plurality of training subjects. In some aspects, generating the training report further includes preventing certain portions of the training report from further edits after a pre-determined event occurs.

20 Claims, 6 Drawing Sheets

(56) References Cited

U.S. PATENT DOCUMENTS

| | | | |
|---|---|---|---|
| 2012/0231441 A1* | 9/2012 | Parthasarathy | G09B 7/02 434/362 |
| 2016/0381210 A1* | 12/2016 | Kenjalkar | H04W 76/38 455/419 |
| 2019/0272770 A1* | 9/2019 | Kortan | G09B 5/065 |
| 2020/0219216 A1* | 7/2020 | Davis | H04L 12/1822 |
| 2021/0374888 A1* | 12/2021 | Holmes | G06Q 50/205 |
| 2021/0390154 A1* | 12/2021 | Wagner | G06F 16/9538 |
| 2024/0371485 A1* | 11/2024 | Vidovic | G16H 40/67 |

* cited by examiner

SYSTEMS AND METHODS FOR TRAINING AND EVALUATION

CROSS-REFERENCE TO RELATED APPLICATIONS

This application is a continuation of commonly owned U.S. Ser. No. 17/329,601, filed on May 25, 2021; which claims benefit of priority with U.S. Provisional Application Ser. No. 63/030,918, filed May 27, 2020 and further claims of priority with U.S. Provisional Application Ser. No. 63/192,447 filed May 24, 2021; the entire contents of both U.S. Provisional applications are hereby incorporated by reference.

BACKGROUND

Field of the Invention

This invention relates to systems and methods for training and evaluation, and more particularly relates to graphical user interfaces and training report generation.

Description of the Related Art

Proper training of police officers, firefighters and other public servants is essential for a community to operate effectively. A trainee who receives insufficient or incorrect training can lead to loss of life and property, in addition to increased risk to the trainee and others on their team. Current systems and methods used to conduct, track, record, and evaluate trainees are outdated and insufficient, creating multiple problems for the trainees and the communities they serve.

Most jurisdictions use one of two possible methods for recording deficiencies and violations during training. The first method involves not recording any serious deficiencies or safety violations as training related problems. This leaves departments to record any significant training issues as personnel issues only and leaves no record for trainers and supervisors to evaluate root causes. In addition, this method means the threshold for documentation of issues remains high, as administrative corrective measures are usually considered "formal discipline". The second method involves recording all violations or deficiencies in a department's training records. Unfortunately, most deficiency or violation judgements are made subjectively. The first method of not documenting training issues at all prevents departments from data that could lead to critical shifts in training focus, training doctrines, or identifying individuals who would benefit from remedial training. The second method incentivizes both the trainer and trainee not to push boundaries for fear of repercussions that may result later if such attempts to improve are considered "failures". It can be questioned by a defense attorney in a subsequent civil or criminal trial where doubt can be planted in a jury's mind that an officer was not properly trained in a particular subject area. Effectively, the second method does not incentivize improvement. The recordation of such deficiencies is subjective, creating different standards and expectations from training event to training event. Entry of trainings, evaluations, and the like are often a manual process where a significant number of hours are wasted by the trainer that could have been used more effectively in other areas. In addition, manual systems have a single point of failure, which is typically the individual managing the training documentation process. Depending on a size of a team, the single point of failure can lead to a loss of critical training data, which is often needed in the aftermath of a critical incident.

Training sessions are generally only recorded one training subject due to the limitations of current technology available. Even if a training session comprises multiple training subjects, which often occurs to simulate complexity of real-world situations, only a single training subject will be recorded. This creates multiple problems, including poor visibility of the trainer to assess which training subjects require more focus and attention. A properly trained trainee requires skills in a variety of training subjects, and being forced to train on subjects already sufficiently covered creates redundancy which results in other training subject areas receiving little or no attention. Problems also exist related to a lack of support when evidence is needed to demonstrate a trainee has had sufficient training related to a particular subject. In addition, categorization is not standardized which makes recall challenging and sometimes not feasible at all.

Current technologies to assist trainers include using a homemade database, a standard spreadsheet program, hard copies, or a combination thereof. Each current solution has its own limitations which are not addressing the problems described herein. Homemade databases allow for limited recall of recorded documents, which is usually limited to a subject, name of the trainee, or date. If a person's training and certifications are needed, the trainer has to print a report containing trainings and certifications the person has ever been a part of over a long period of time. Most of these trainings and certifications in the report are not relevant for the purpose of determining how much training the person received on a particular subject. Going through these reports requires additional administrative hours spent which could be used more effectively, such as more time spent improving skills of the trainees. Standard spreadsheet worksheets can capture more detail, but require more hours spent to manual enter each entry. Even with a collection of more data, a trainer still lacks a comprehensive view to see how often a training subject is being covered, especially given the overlap of subjects in different kinds of trainings. Additionally, due to the decentralized nature of current solutions, there is a missed opportunity to integrate training and evaluations with other areas of a department, such as reporting, operations, logistics, and administration.

There is an ongoing need for an improved system and method for training and evaluation.

SUMMARY

The disclosure concerns systems and methods related to a training protocol for improved training and evaluations. In some embodiments, the systems and methods may comprise a graphical user interface where after selecting an evaluated trainee and an evaluated task, a score input region populates certain features associated with the evaluated trainee and the evaluated task, including a score region. In some embodiments, the systems and methods may further comprise generating a training report which is configured to receive a plurality of training subjects. In some aspects, generating the training report further includes preventing certain portions of the training report from further edits after a pre-determined event occurs.

Other advantages and benefits may be further appreciated from the appended detailed descriptions.

BRIEF DESCRIPTION OF THE DRAWINGS

Other features, combinations, and embodiments will be appreciated by one having the ordinary level of skill in the art upon a thorough review of the following details and descriptions, particularly when reviewed in conjunction with the drawings, wherein.

DETAILED DESCRIPTION

For purposes of explanation and not limitation, details and descriptions of certain preferred embodiments are hereinafter provided such that one having ordinary skill in the art may be enabled to make and use the invention. These details and descriptions are representative only of certain preferred embodiments, however, and a myriad of other embodiments which will not be expressly described will be readily understood by one having skill in the art upon a thorough review of the instant disclosure. Accordingly, any reviewer of the instant disclosure should interpret the scope of the invention only by the claims, as such scope is not intended to be limited by the embodiments described and illustrated herein.

For purposes herein, the term "training protocol" means a protocol comprising multiple phases such as Training, Assessment, and Certification.

The term "Training" means an initial phase of the training protocol.

The term "Evaluation" means Assessments or Certifications.

The term "Assessments" means an evaluation subsequent to training, whereby a student's performance is evaluated. Multiple Training Subjects can be assessed in a single Assessment.

The term "Certifications" means an Evaluation subsequent to either Training or Assessment. Certifications demonstrate proficiency in a particular Training Subject.

The term "category" means a high-level categorization designation describing the topic of a Training or Evaluation. Examples may include Tactics or Firearms.

The term "training subject" means a narrower categorization designation relative to a category which defines the main topic of the Training and subsequent Evaluation.

The term "sub-type" means a narrower categorization designation relative to the training subject which further defines the training subject. An "Active Shooter" training subject may include "Interior-Residential" or "Interior-Commercial". An "AR15" training subject may include "Weapons Handling", "Marksmanship", or "Moving and Shooting". Training subjects may comprise multiple sub-types.

The term "multidisciplinary" means comprising a plurality of training subjects and/or a plurality of sub-types. The training subjects may be associated with a same or different category.

The term "skills" means a categorization based on training subject and sub-type.

The term "lesson plan" means a written description of what has or will take place in a Training and subsequent Evaluation.

The term "trainee" means either a student or a group.

The term "trainee icons" means a student icon or a group icon configured to receive a score from a task.

The term "repetitions" means a task, drill, or scenario included with a training or evaluation.

Unless explicitly defined herein, terms are to be construed in accordance with the plain and ordinary meaning as would be appreciated by one having skill in the art.

General Description of Embodiments

In a first embodiment, a method of evaluation executed by a computing system is disclosed. The method comprises displaying a plurality of trainee icons wherein each of the plurality of trainee icons is associated with one or more students, selecting an evaluated trainee from the plurality of trainee icons, displaying a plurality of task icons wherein each of the plurality of task icons is associated with one of a plurality of tasks, selecting from the plurality of task icons an evaluated task, upon selection of the evaluated trainee and the evaluated task, generating a score input area associated with the evaluated task, receiving an input score in the score input area, and updating one or more databases associated with the one or more students and the evaluated task.

In some embodiments, trainee icon may further comprise a status indicator, wherein the status indicator is configured to display a status based on a percentage of the plurality of tasks completed. In other embodiments, the status indicator may further display a status when the plurality of tasks is complete for the trainee icon. The status indicator may always display or only display upon selection of the trainee icon.

The method may further comprise selecting a group icon associated with the one or more students, and displaying one or more student icons wherein each student icon comprises one student from the one or more students.

In some embodiments, one of the plurality of task icons associated with the evaluated task may display a task indicator. The task indicator may indicate selection, status, completion, or a combination thereof.

In some embodiments the plurality of tasks displayed may depend on the evaluated trainee selected. In other embodiments, the plurality of tasks displayed remains static regardless of evaluated trainee selected.

In some embodiments, the method of evaluation executed by the computing system may further comprise displaying a progress bar.

The method of evaluation executed by the computing system of claim 1, further comprising: displaying a progress bar.

In a second embodiment, a computer system comprising a display screen, at least one processor and memory that comprises instructions is disclosed. The computer system, when executed by the at least one processor, causes the at least one processor to perform acts comprising displaying a plurality of trainee icons wherein each of the plurality of trainee icons is associated with one or more students, selecting an evaluated trainee from the plurality of trainee icons, displaying a plurality of task icons wherein each of the plurality of task icons is associated with one of a plurality of tasks, selecting from the plurality of task icons an evaluated task, upon selection of the evaluated trainee and the evaluated task, generating a score input area associated with the evaluated task, receiving an input score in the score input area, and updating one or more databases associated with the one or more students and the evaluated task.

In a third embodiment, a computer-readable data storage medium in a computer system is disclosed. The computer-readable storage medium comprises instructions that, when executed by a processor of the computer system, cause the processor to perform acts comprising displaying a plurality of trainee icons wherein each of the plurality of trainee icons is associated with one or more students, selecting an evaluated trainee from the plurality of trainee icons, displaying a plurality of task icons wherein each of the plurality of task icons is associated with one of a plurality of tasks, selecting from the plurality of task icons an evaluated task, upon selection of the evaluated trainee and the evaluated task, generating a score input area associated with the evaluated task, receiving an input score in the score input area, and updating one or more databases associated with the one or more students and the evaluated task.

In another embodiment, a method of generating a training report executed by a computing system is disclosed. The method comprises selecting an elected category from a plurality of categories, displaying from a plurality of all training subjects a plurality of training subjects associated with the elected category, selecting a first training subject from the plurality of training subjects associated with the elected category, inputting a roster comprising one or more students; and inputting a lesson plan.

In some embodiments, the method of generating the training report may further comprise selecting a multidisciplinary option wherein the multidisciplinary option is configured to display the plurality of all training subjects, and selecting a second training subject from the plurality of all training subjects.

In some embodiments, the method of generating the training report may further comprise linking an evaluation to the training report, and upon linking the evaluation to the training report, preventing one or more previously editable portions from modification. Previously editable portions may include the lesson plan, the category the first training subject, the second training subject, or a combination thereof.

In some embodiments, the method of generating the training report may further comprise assigning a training identifier to the training report. Additionally, the method may further comprise assigning an evaluation identifier to the evaluation wherein the evaluation identifier and the training identifier are associated with respect to each other.

In some embodiments, the method of generating the training report may further comprise inputting one or more repetitions.

In some embodiments, the method of generating the training report may further comprise displaying from a plurality of all sub-types a plurality of sub-types associated with the elected category, and selecting a first sub-type from the plurality of sub-types associated with the elected category.

While various details, features, steps, and combinations are described in the illustrated embodiments, one having skill in the art will appreciate a myriad of possible alternative combinations and arrangements of the features and/or steps disclosed herein. As such, the descriptions are intended to be enabling only, and non-limiting. Instead, the spirit and scope of the invention is set forth in the appended claims. Methods and/or processes disclosed herein may include steps comprising an alternative order.

Figure 1:
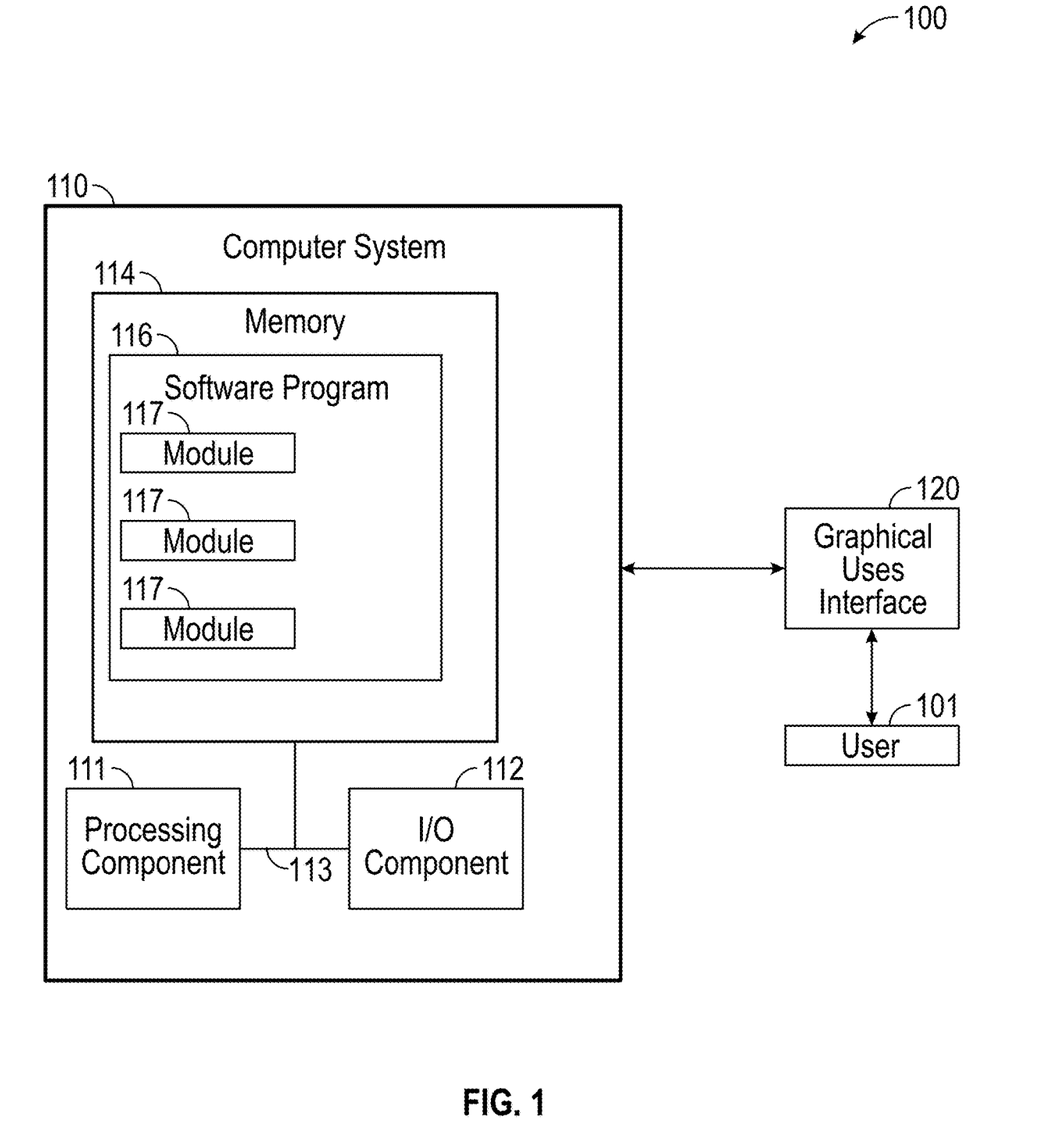
FIG. 1 is a system block diagram representation for managing a graphical user interface according to an embodiment.

Turning to the drawings, FIG. 1 shows a system block diagram representation for managing a graphical user interface (120) according to an embodiment. To this extent, the block diagram (100) includes a computer system (110) that can perform a process described herein in order to manage the graphical user interface. In particular, the computer system is shown including a software program (116), which makes the computer system operable to manage the graphical user interface during operation.

The computer system (110) is shown including a processing component (111) (e.g., one or more processors), a memory (114), an input/output (I/O) component (112) (e.g., one or more I/O interfaces and/or devices such as display screen), and a communications pathway (113). In general, the processing component executes program code, such as the software program (116), which is at least partially fixed in the memory. While executing program code, the processing component can process data, which can result in reading and/or writing transformed data from/to the memory and/or the I/O component for further processing. The pathway provides a communications link between each of the components in the computer system. The I/O component can include one or more human I/O devices, which enable a user (101) to interact with the computer system and/or one or more communications devices to enable the user to communicate with the computer system using any type of communications link. To this extent, the software program can manage a set of interfaces (e.g., graphical user interface(s) (120), application program interface, and/or the like) that enable human and/or system users to interact with the software program. Furthermore, the software program can manage (e.g., store, retrieve, create, manipulate, organize, present, etc.) the data using any solution.

The memory (114) optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards. The memory stores the software program (116), while the processing component (111) is operable to execute the software program. Executing the software program (116) on the processing component results in generating and rendering the graphical user interface (120) on a display screen. The graphical user interface is configured to facilitate user interactions.

Optionally, the computer system (110) includes non-transient data storage arrangements, for example, such as a database (not shown). The software program (116), when executed on the processing component (111), is optionally coupled to the database. The software program, when executed on the processing component, is optionally configured to update changes by the user (101) in the database.

In any event, the computer system (110) can include one or more general purpose computing articles of manufacture (e.g., computing devices) capable of executing program code, such as the software program (116), installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the software program (116) can be embodied as any combination of system software and/or application software.

Furthermore, the software program (116) can be implemented using a set of modules (117). In this case, each module can enable the computer system (110) to perform a set of tasks used by the software program, and can be separately developed and/or implemented apart from other portions of the software program. As used herein, the term "component" means any configuration of hardware, with or without software, which implements the functionality described in conjunction therewith using any solution, while the term "module" means program code that enables a computer system to implement the actions described in conjunction therewith using any solution. When fixed in the memory (114) of a computer system that includes the processing component (111), the module is a substantial portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system.

When the computer system (110) includes multiple computing devices, each computing device can have only a portion of the software program (116) fixed thereon (e.g., one or more modules (117). However, it is understood that the computer system and the software program are only representative of various possible equivalent computer systems that may perform a process described herein. To this extent, in other embodiments, the functionality provided by the computer system and the software program can be at least partially implemented by one or more computing devices that include any combination of general and/or specific purpose hardware with or without program code. In each embodiment, the hardware and program code, if included, can be created using standard engineering and programming techniques, respectively.

Regardless, when the computer system (110) includes multiple computing devices, the computing devices can communicate over any type of communications link. Furthermore, while performing a process described herein, the computer system can communicate with one or more other computer systems using any type of communications link. In either case, the communications link can include any combination of various types of optical fiber, wired, and/or wireless links; include any combination of one or more types of networks; and/or utilize any combination of various types of transmission techniques and protocols.

As discussed herein, the software program (116) enables the computer system (110) to manage the graphical user interface (120). To this extent, the computer system can generate the graphical user interface for display to a user (101). The computer system displays the graphical user interface directly to the user, or communicate the graphical user interface for display to a user on another computing device.

Figure 2:
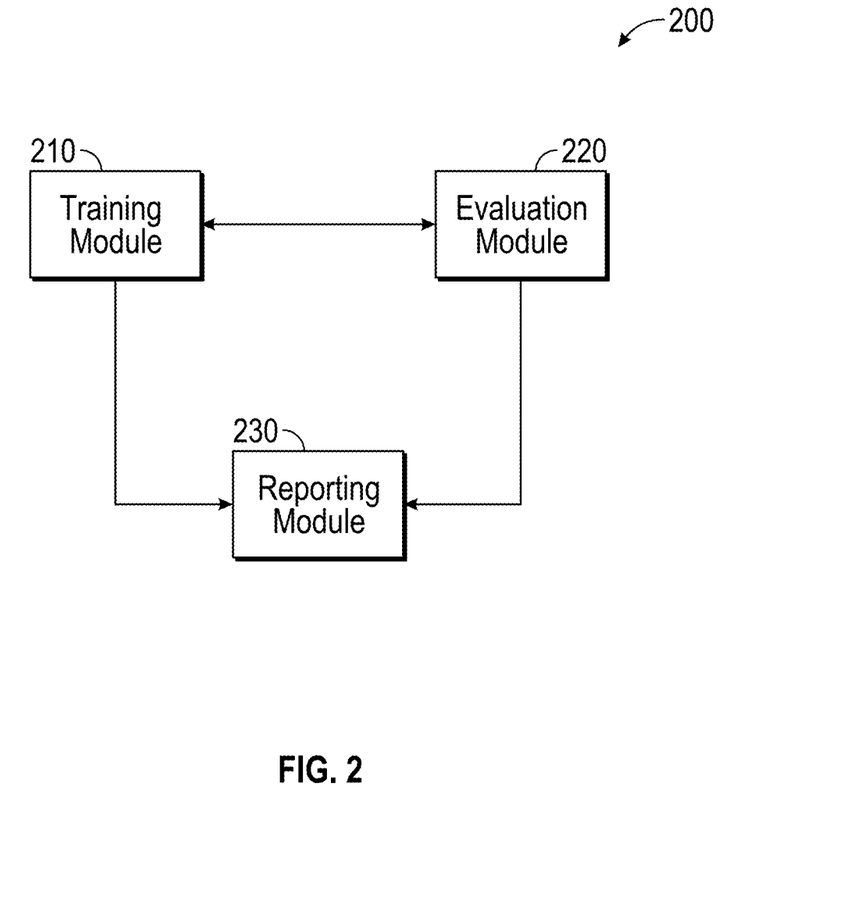
FIG. 2 is a block diagram representation of a plurality of modules according to an embodiment.

FIG. 2 is a block diagram representation of a plurality of modules (200) according to an embodiment. The plurality of module comprises a training module (210), an evaluation module (220), and a reporting module (230) wherein each is communicatively coupled with the others. The plurality of modules, as shown in FIG. 1, establishes a new training protocol which addresses limitations present in current methodologies. Due to the modules being centralized and integrated amongst one another, the new training protocol is a solution to issues related to training time and focus. Training time issues are solved by creating a more efficient process of planning, tracking and evaluation of trainings. Training focus issues are solved by providing management and trainers with an oversight not previously available, which allows tracking and determining which areas the trainers and trainees should spend their time. One having ordinary skill in the art in tactical training will appreciate a plurality of unique challenges faced in the art. The tactical training art requires continual training of a large amount of complex and detailed scenarios and situations, all of which may need to be performed by a large group of trainees.

One objective of the training module (210) is to provide to both trainers and trainees a freedom to attempt new and different situations and scenarios without fear of repercussion from failing. Different situations and scenarios may comprise various combinations of training subjects, sub-types, equipment, vehicles, skills, and the like. The different situations and scenarios may further comprise more challenging repetitions such as longer distance, shorter times, or smaller targets. To accomplish this desired freedom, the training module only tracks catastrophic and safety violations which occur during training. All other events are not tracked in the training module and are instead delegated to the evaluation module (220). The training module includes creating a training report which may comprise various inputs such as date, location, trainer, trainees, category, one or more training subjects, one or more sub-types, equipment, vehicles, skills, and other inputs appreciated by one having in the art. When one or more evaluations are linked to a training report, some or all portions of the training report are no longer editable so as to preserve history and ensure the evaluations and reports coupled therewith can show a consistent relationship over time. Each training report further comprises a training identifier generated by the training module which may comprise numbers and/or letters. Generally, the training identifier is generated in a chronological order relative to other training reports.

The evaluation module (220) comprises evaluations wherein each evaluation is related to one training report from the training module (210). Evaluations may include assessments or certifications. The assessments are typically considered an intermediary step between training and certification are intended to be informational, where scores are assigned but a failure level is usually not provided. Assessments should be less formal but more challenging than the corresponding certification. Scoring, or grading, options may include numerical scores, pass/fail, or a sliding scale. Assessments allow testing of multiple training subjects at once, where certifications generally only test one training subject. Generally, certifications are saved indefinitely as compared to assessments which may not be.

The evaluation module (220), like the training module (210), has most if not all inputs configured to be searchable. This allows for an evaluation (or training), which can be highly complex, to search and track a plurality of inputs. The plurality of inputs may include a category, training subjects, sub-types, skills, equipment, and/or vehicles. For example, when a skill of night vision is utilized in a plurality trainings and/pr assessments, even if it wasn't a focus so as to classify night vision as a training subject or sub-type, the skill of night vision can still be tracked and searched. This allows a trainer to determine that a sufficient amount of time was spent on night vision even though none of the trainings and/or assessments had night vision as a training subject. Therefore, creating a new training/assessment where night vision is a training subject may be unnecessary. The evaluation module is also configured to generate an evaluation identifier for each evaluation created. The evaluation identifier is linked to a training identifier of a corresponding training report.

The reporting module (230) is configured to pull data from the training module (210) and/or evaluation module (220). The reporting module can track a particular assessment conducted over a period of time and provide insight both on performance of trainees associated therewith along with difficulty level of the assessment itself. Generally, visual aids generated by the reporting module include graphs which can display assessment performances over time. Graphs can be specific to include information from a training report or evaluation such as category, training subject, sub-type, or the like.

In other embodiments, other modules may also be present such as an operations module, an administrative module, a logistics module, a notifications module, or a combination thereof. Individually, each of these modules may provide benefits to an organization. However, when each module is linked with other modules, it can allow for better control, oversight, and improved inefficiency.

The operations module may be utilized for operations including serving warrants, seizures, or preplanning of missions. Items seized and damaged during an arrest may be reported and documented in the operations module. Documents, like pictures, may be uploaded or linked in addition to further detail from a user. This can provide an easier recall and provides justification of any actions taken by the user. Other operations can also benefit upon integration with a centralized system as described. Targets from a same time arrest, where multiple individuals are arrested and/or searched simultaneously from different locations, can be linked together providing benefits such as a coordinated execution. Pre-planning of operations can also be streamlined as only new information may needed to be updated and/or inputted. Since all documents and entries are saved and linked within the system, missions of a similar nature can be recalled.

The administrative module may function as a personnel management of the centralized system, wherein the administrative module comprises a list of a plurality of members. The plurality of members may comprise trainees, trainers, management, administrators, and other employees of an organization. Each member of the plurality of members may be assigned to one or more rosters. Each of the one or more rosters may later be associated with trainings, evaluations, reporting, operations, and other modules integrated therewith. The administrative module may also function as an option for a member to view status of their certifications, thereby providing another safeguard against unintentional expirations.

The logistics module can provide oversight to all items used in various areas including training and operations. Items, such as firearms, ammunition, and other accessories, can each include a specific barcode which can be logged in the logistics module (such as by barcode scanning, picture recognition, or manual entering). In conjunction with the administrative module, the logistics module provides an even deeper level of logistics control where items assigned to any member can be logged and tracked. Any items consumed during training and/or operations may be logged and deducted from the inventory, thereby allowing for proper inventory control and more accurate forecasting.

The notification module may be utilized to provide push notifications to members both as a reminder and as a form of communication. Approval from a manager can be required for trainings, evaluations, operations, etc., and by utilizing notifications, the manager can be properly notified and provide instant approval, all of which is track and documented. Likewise, the manager may create trainings, evaluations, operations, or the like and assign it to a subordinate, who can be subsequently notified via the notification module. Due to the integration and centralization of each of the modules communicatively coupled together, the notifications module may provide advance notice before certifications may expire for trainees associated therewith, therefore adding an additional safeguard and ensuring trainees are maintaining all essential certifications.

Figure 3:
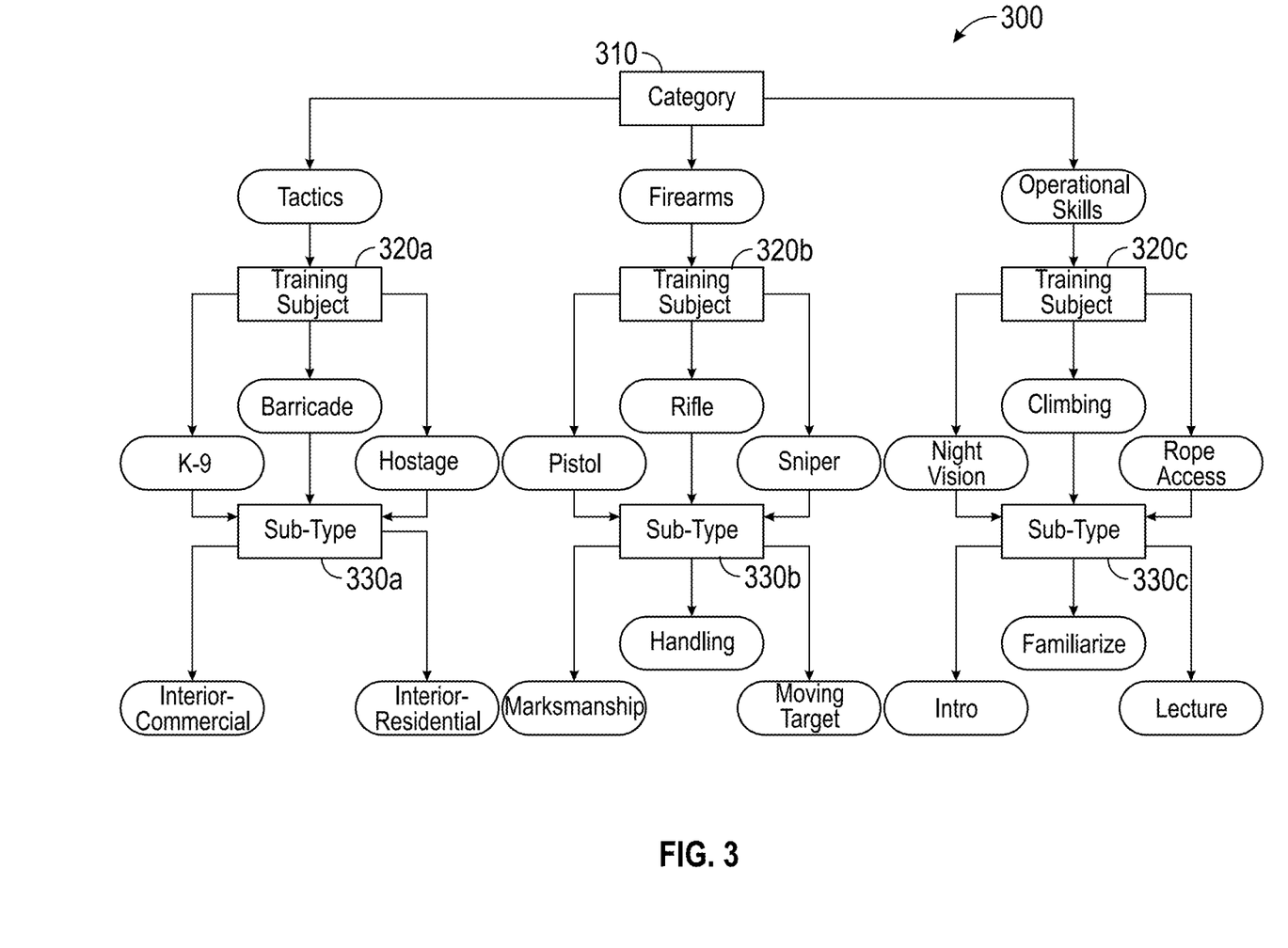
FIG. 3 is a hierarchical diagram illustrating categories, training subjects, and sub-types according to an embodiment.

FIG. 3 shows a hierarchical diagram illustrating categories (310), training subjects (320a; 320b; 320c), and sub-types (330a; 330b; 330c) according to an embodiment. Multiple categories are illustrated, namely Tactics, Firearms, and Operational Skills. Each of the categories may comprise one or more training subjects associated therewith. The category of Firearms comprises the training subjects Pistol, Rifle, and Sniper. Each of the training subjects may further comprise one or more sub-types associated therewith. Subtypes of Pistol, Rifle, and Sniper each may further comprise Marksmanship, Handling, and Moving Target. In some embodiments, some training subjects may comprise sub-types which are not related to other training subjects under the same category. Examples, as illustrated, are intended to be exemplary for illustrating categories, training subjects, and sub-types. One having ordinary skill in the art will appreciate there are a myriad of possible categories, training subjects, and/or sub-types depending on particular department's domain and focus.

Figure 4:
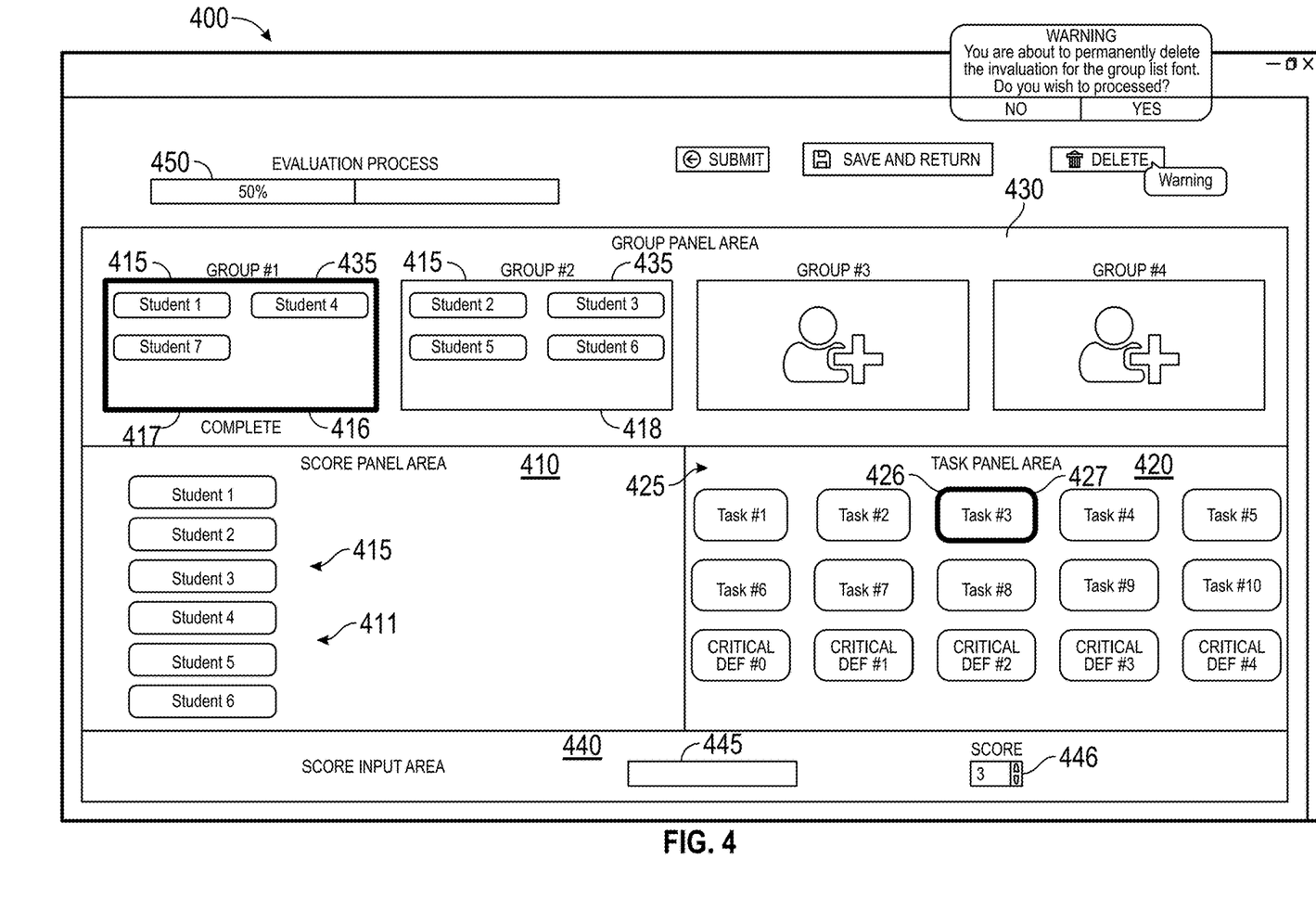
FIG. 4 is an illustrative graphical user interface used for recording evaluations according to an embodiment.

FIG. 4 shows an illustrative graphical user interface (400) used for recording evaluations according to an embodiment. The graphical user interface comprises a plurality of areas, namely a group panel area (430), a student panel area (410), a task panel area (420), and a score input area (440). Contained within the group panel area are multiple group icons (435) wherein each group icon contains one or more students with a name of each student displayed. The student panel area comprises a plurality of student icons (411) wherein each student icon corresponds to a particular student with the name of the student being displayed. The task panel area comprises a plurality of task icons (425) wherein each of the plurality of task icons corresponds to a particular task. Tasks may also include drills and critical deficiencies. The group panel area, the student panel area, and the task panel area are configured to assist a user in differentiating each panel area distinctly from the others. Each of the panel areas may comprise a large number of icons such that without each of the panel areas, utilization of the graphical user interface can be difficult.

A trainee icon (415) may comprise a group icon or a student icon. Once a trainee icon is selected, in addition to one of the plurality of task icons (425), the score input area (440) will then comprise information and inputs corresponding therewith. Specifically, the score input area will comprise a task description (445) and a score region (446) as shown. The task description will relate to the task icon selected, also known as an evaluated task (426). The task description provide a title and/or detail of the evaluated task. Upon the score region receiving a score, a database is updated to recognize the score for the corresponding student or group. In some embodiments, the score cannot be altered after being inputted into the score region. In other embodiments, the score can be altered by inputting a new score for a particular trainee and task and overriding any previously inputted scores. Generally, no further action is needed, such as a submit button, to update the score after the score has been entered into the score region. The user then may select another task icon and/or trainee icon for evaluation recordation. Once a user has completed entering all scores for all students and/or groups, the user may then submit the evaluation. Additionally, the trainee may submit the evaluation prior to completion of all tasks by all trainees, but will generally receive a warning before submission is final.

A group score is used when the evaluation is for an entire group, known as a group evaluation, where the group receives a single score based on performance as a team. A student score is used when the evaluation is for an individual student, known as a student evaluation, where a single student receives the score based on their performance as an individual. In some embodiments, a created evaluation comprises one or more group evaluations and no student evaluations. In such an embodiment, the student panel area (410) may populate no student icons (411), or alternatively, the graphical user interface (400) will not generate a score input area (440) upon selection of the student icon and the evaluated task (426) where the evaluated task is associated with the group evaluation. Conversely, in some embodiments, the created evaluation may comprise one or more student evaluations and no group evaluations. In such an embodiment, group icons (435) may either unavailable, non-selectable, or may be selectable but will not generate the score input area upon selection of the group icon and the evaluated task where the evaluated task is associated with a student evaluation. Yet in other embodiments, both group and student evaluations are conducted with a single evaluation. In such an embodiment, different approaches may be implemented to handle a plurality of tasks where some of the plurality of tasks are associated with group evaluations and others are associated with student evaluations. One approach may include displaying all the plurality of task icons (425) in the task panel area (420) regardless of which trainee icon (415) is selected. When the evaluated task is selected with a trainee icon which doesn't match (student icon or group icon), no score input area will be generated. Another approach may include the task panel area displaying tasks icons from the plurality of task icons which corresponds with the trainee icon selected. In such an approach, no task icons are initially displayed when the user begins operating the graphical user interface. Only when the user has made a trainee selection, and the graphical user interface correspondingly selects the trainee icon, will task icons subsequently be displayed.

The score region (446) is configured to receive a score based on the user's input. The score may comprise a pass/fail, a sliding scale, or a numeric scale depending on the task associated therewith. For example, time-based tasks are normally pass/fail and tasks related to marksmanship are normally scored. A task related to snipers will likely be scored for accuracy (numeral score) in comparison to a task related to a pistol is pass/fail. The sliding scale may be utilized for tasks comprising multiple rounds of sub-tasks such that each round may be worth, for example, a possible ten points. Other scoring configurations can be used as appreciated by one having skill in the art.

To promote ease of use, certain indicators are provided to the user for informational purposes. For example, a trainee icon (415) may comprise a status indicator (416) wherein the status indicator is configured to provide an indication to the user. An indication may include when the trainee icon is selected or a percent completion of tasks associated with the trainee (group or student). In some embodiments, the status indicator may represent a gradient showing a percentage between zero and one hundred percent. In other embodiments, the status indicator represents when either all tasks are complete or, if not all tasks are complete. The status indicator may include words, colors, or any other visual aid which can be appreciated by one having skill in the art. As shown, a completed group icon is shown having a first status indicator (417) comprising a first color bordering the group icon (435) and a word "COMPLETE". An incomplete group icon is showing having a second status indicator (418) comprising a second color filling the group icon. The second status indicator as shown represents not all tasks have been completed by the students within the group. In other embodiments, when the status indicator comprises a gradient scale, the trainee icon associated may have a portion thereof filled in by a color corresponding to a percentage of completed tasks.

Figure 6:
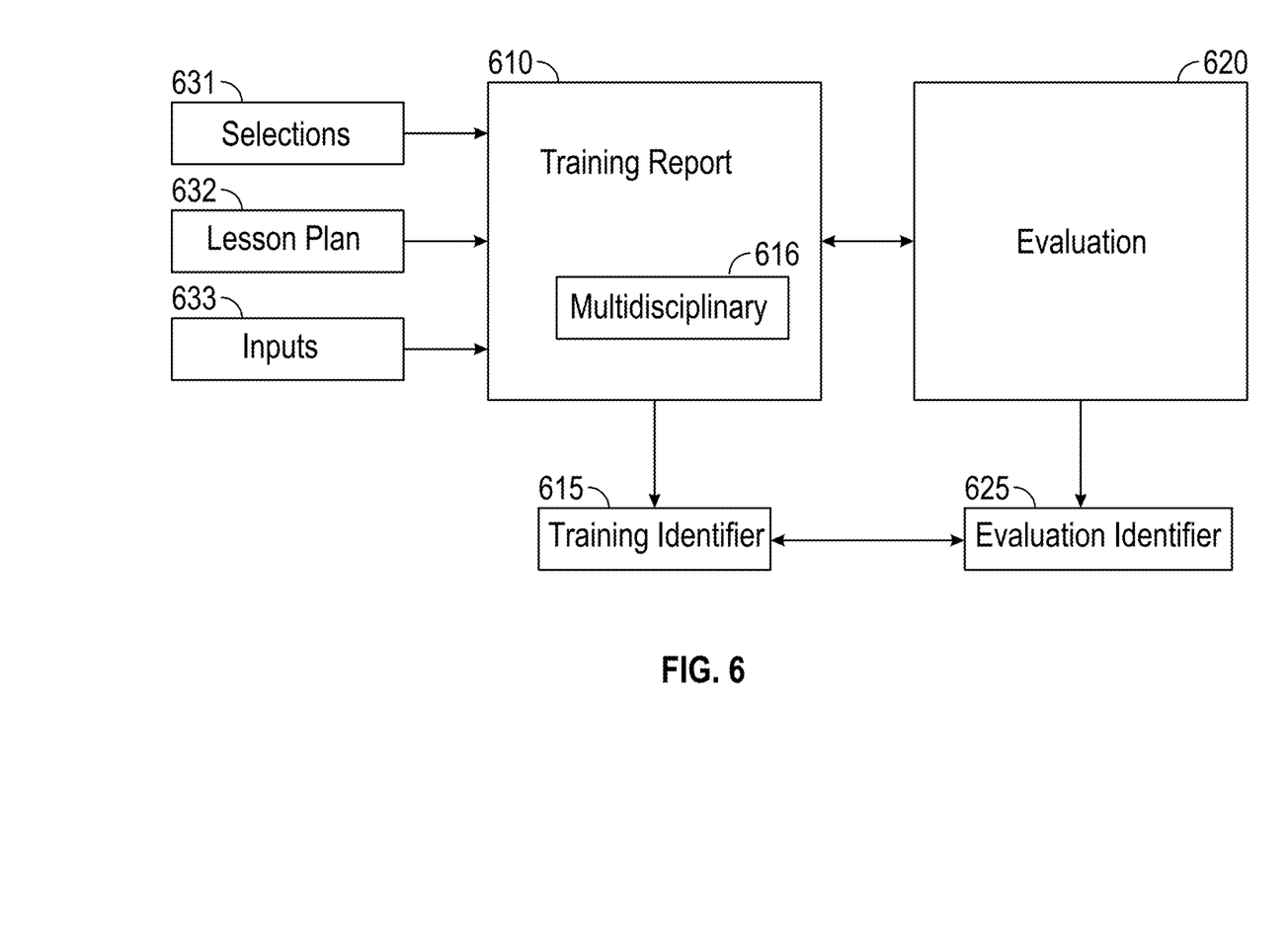
FIG. 6 is a block diagram representation for generating a training report according to an embodiment.

Generally, group icons (435) and student icons (411) are created when an initial evaluation is made, which is further derived from a corresponding training report (610, FIG. 6). However, in some embodiments, an option to create a group icon at a later time may be available. Newly made group icons can be created by dragging a student icon from the student panel area (410) and placing the dragged student icon into the newly made group icon. The student icon will remain in the student panel area but will additionally occupy the newly made group icon. Tasks associated with the newly made group icon can either include all tasks present which are associated with a group evaluation. Alternatively, tasks can be associated with the newly made group icon by dragging a task icon into the newly made group icon. Task icon will not occupy the group icon, but in the backend a linkage will form between the newly made group icon the task icon. A student may be removed from a group icon by selecting a name contained within the group icon and pressing delete. A warning message will normally be prompted confirming deletion. In some embodiments, students can be added to group icons which were initially created when the evaluation was made.

A task indicator (427) is shown representing when the evaluated task (426) is selected. The task indicator may comprise visual aids similar to the status indicator (416) and will generally comprise a different color from the status indicator to provide ease of differentiation between the various icons and indicators. In some embodiments, a task icon (425) which has received a score for a particular trainee, may comprise a task-complete indication where the task is marked to show the task has been completed by the particular student or group, regardless if the task icon is selected. The task-complete indication will allow a user to select a trainee icon (415) and immediately be informed of which task icons have already received scores. This can be beneficial when the user is inputting scores for multiple trainees doing multiple tasks in a varying order. The graphical user interface (400) may further include a progress bar (450). The progress bar is intended to show the user what percentage of all tasks by all users in the evaluation have been completed. This can provide an important status on the overall evaluation and can assist with proper time management.

One objective of the graphical user interface (400) is to make inputting and recording of evaluations much simpler and more efficient for the user. In effect, when a combination of a trainee icon (415) and an evaluated task (426) are selected, the graphical user interface will populate the score input area (440) with the task description (445) and the score region (446) configured to receive appropriate scoring options. In some embodiments, the score input area comprises the score region without the task description. The system is intended to be as intuitive as possible. The graphical user interface allows the user to add scores to an individual's evaluations in any order, either by trainee or task, at any time, without requiring to change screens or keep track of changes. Conventional practice requires the user to either have multiple windows open on a computer system and constantly toggle between them all, or the user may resort to manually recording the results and transcribe them at a later time. Evaluations, such as ones in a tactical field like police or SWAT training, may comprise many tasks each being completed by many trainees. Without the trainer having a graphical user interface as described herein, results may be entered incorrectly or the trainer may limit the number of tasks and/or trainees being evaluated.

Figure 5:
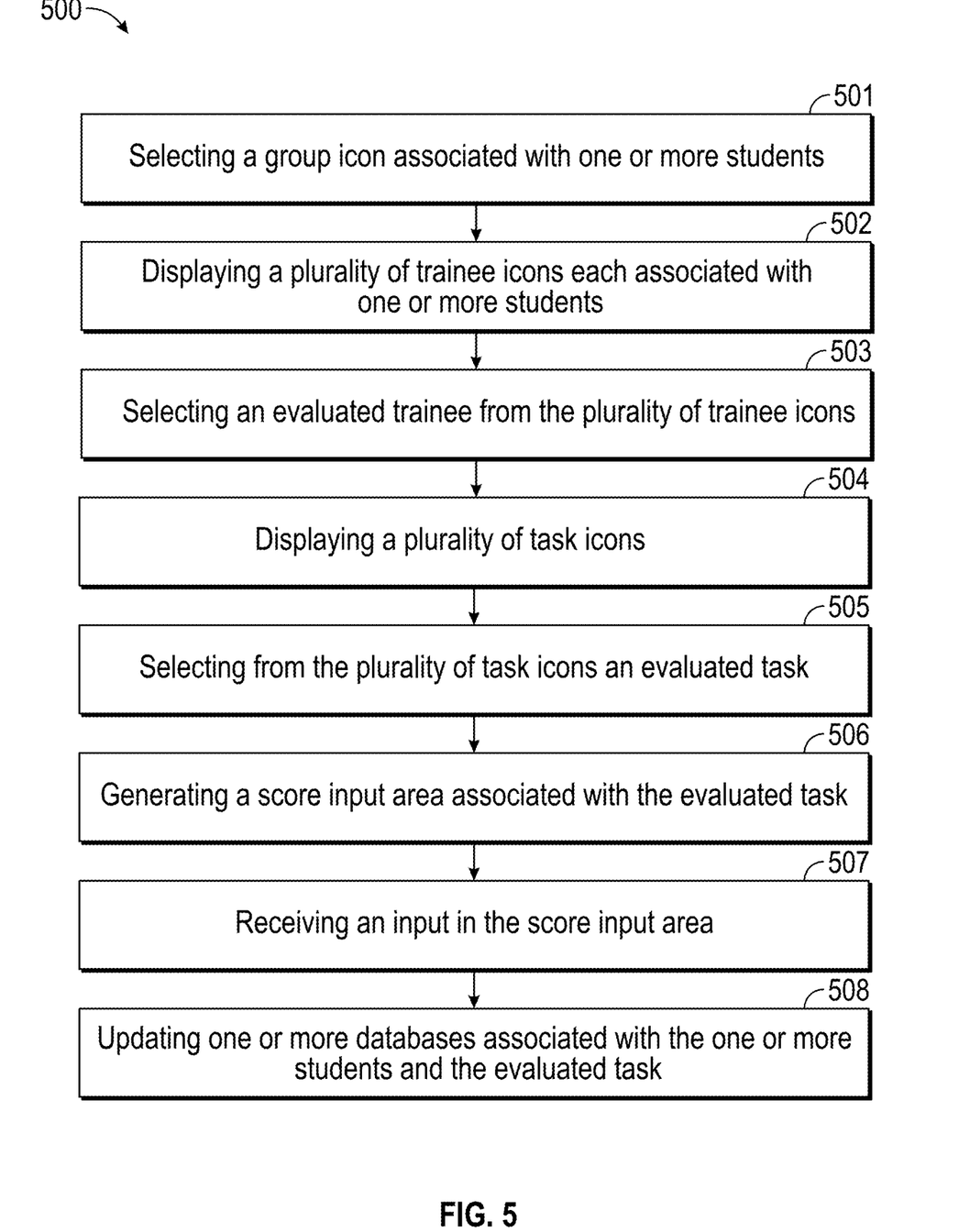
FIG. 5 is a flow diagram of an example process for recording evaluations according to an aspect.

FIG. 5 shows a flow diagram (500) of an example process for recording evaluations according to an aspect. The method comprises the steps:

- Step 1: selecting a group icon associated with one or more students (501). This step may be skipped if trainee icons are displayed automatically in a student panel area.
- Step 2: displaying a plurality of trainee icons each associated with one or more students (502). The plurality of trainee icons may be displayed in the student panel area, a group panel area, or both. Trainee icons comprise student icons and group icons.
- Step 3: selecting an evaluated trainee from the plurality of trainee icons (503). The evaluated trainee may either be an individual or a group.
- Step 4: displaying a plurality of task icons. Each of the plurality of tasks icons is associated with one of a plurality of tasks (504). Tasks may include drills, scenarios, critical deficiencies, and any other meaning of "task" understood by one having skill in the art.
- Step 5: selecting from the plurality of task icons an evaluated task (505).
- Step 6: generating a score input area associated with the evaluated task (506). The score input area may display a score input area and a description of the evaluated task. The score input area, or contents therein, are displayed upon a selection of the evaluated trainee and the evaluated task.
- Step 7: receiving an input in the score input area (507). The score may comprise a pass/fail, numerical value, or sliding scale.
- Step 8: updating one or more databases associated with the one or more students and the evaluated task (508). The database being updated can be associated with the evaluation, training report, student profile, or a combination thereof.

It is understood that when a user makes a selection on a graphical user interface, whether by mouse, touchscreen, or the like, the graphical user receives the selection by the user and subsequently selects the appropriate icon corresponding to the user's selection.

FIG. 6 shows a block diagram representation for generating a training report (600) according to an embodiment. The block diagram comprises a training report (610) figured to receive one or more selections (631), a lesson plan (632), and one or more inputs (633). The training report is further configured to link with one or more evaluations (620). The training report is assigned a training identifier (615) and each of the one or more evaluations is assigned a unique evaluation identifier (625). The training identifier can be generated and assigned without a corresponding evaluation identifier. However, generation and assignment of the evaluation identifier to an evaluation requires a link with one training identifier to function properly given that training should occur prior to evaluations.

The one or more selections (631) may comprise options that come preloaded and are selectable by a user. The one or more selections may include a category, a first training subject, and a first sub-types, wherein the first training subject and first sub-type are associated with the category. A multidisciplinary option (616) is also available for selecting a second training subject. The second training subject may or may not be associated with the category initially selected. In some embodiments, the multidisciplinary option further includes a second sub-type for selection wherein the second sub-type is associated with the second training subject. All training subjects are considered a main focus of a training report. A training report may comprise more than one training subject, and is typically limited to two given the time restrictions. The one or more selections may further include equipment, vehicle, and/or skills. Generally, equipment comprises non-firearm items which are the not the main focus of a training report, and therefore not a training subject. Additionally, skills are generally not considered a main focus of the training report but nonetheless deserve recordation for later recall.

Providing more than one category to a training report is not necessary and provides little help to the user. Each category is generally too broad for determining amount of training in a specific area and therefore training subjects are regarded as a better filter. When a more detailed search is required, searching by sub-type may also be available.

Another option available for the one or more selections include a button for creating an evaluation (620) in an evaluation module (220, FIG. 2). Multiple evaluations can be associated with a single training report (610), but only one training report is associated with any evaluations. An evaluation may be linked during initial generation of the training report or may be added at a later time.

The lesson plan (632) comprises a written description of the training that did or will take place. A training event is a database entry in the training module (210, FIG. 2) which allows for creating and editing the eventual training report (610). Once the training event is submitted and approved it becomes the training report where certain portions, including the lesson plan, are no longer editable in order to preserve history with one or more evaluations associated therewith. Data from the training report can also be used for reports generated in the reporting module (230, FIG. 2). The lesson plan may include an imported document loaded into the training entry which is linked and viewable from the training report. The training event comprises a freeform input area where the lesson plan can be inputted, or can be used for additional details in conjunction with the imported document. The user may include repetitions with the imported document if repetitions remain unchanged over similar training reports, or alternatively, the user may use the freeform input area of the training event to add customized repetitions. Repetitions may include various tasks such as drills and/or scenarios. The lesson plan may comprise a personal lesson plan when training an individual or a team lesson plan when training a group.

The one or more inputs (633) may include other important information for the training report (610) such as date, instructor, and a roster. inputs may include critical deficiencies or injuries occurred during training.

Due to the training report (610) being linked to an evaluation (620), to preserve history and ensure consistency, certain portions of the training report which were previously editable would no longer be allowed to change or modify when a certain even occurred. The event may include when the training event is submitted and converted to a training report, or may be when one or more evaluations are linked to the training report. Portions which are no longer editable may include the lesson plan, the roster, the date, the category, the first and second training subjects, and/or any other portions which can be appreciated by one having skill in the art that would be benefit from preventing future edits. Once portions of the training event and/or training report are no longer editable, they become part of a legal record in the training module (210, FIG. 1).

Prevention of future edits can include various methods which can be appreciated by one having skill in the art. In one example, Role Based Access Controls are defined in a same layer of an application as other business logic using "if . . . then" conditional statements. Careful attention would need to be made to ensure human error of a programmer would not unintentionally allow access. Another method may include defining Role Base Access Controls as definition files instead of code given that definition files are easier to read by a human programmer. The software can include a Parser that processes the definition files into SQL procedural language and are written directly to the database itself. In this way, regardless of any mistakes made by the programmer, the database itself will enforce role definitions. The role definitions are stored in a different language from the main business logic of the application. This approach protects the application from several possible risks such as bugs made by programmers, attackers attempting to access the database or write to it, and third-party applications that may write incorrect data if given access.

Creating a software infrastructure for any embodiments disclosed herein can be accomplished by a myriad of systems and/or methods which can be appreciated by one having skill in the art. In one example, the software infrastructure comprises a plurality of layers, where each layer serves a specific purpose, and the plurality of layers is integrated with each other through predefined protocols. The plurality of layers comprises a data persistence layer, an authentication layer, an application and logic layer, and a client application layer.

The data persistence layer is a "lowest" layer in a stack. The data persistence layer is responsible for storing most or all data for users, and it has four requirements. These requirements are generally considered "industry standard" for enterprise grade and resilient software. Not all modern database applications follow these requirements. The requirements include atomicity, consistency, isolation, and durability. Atomicity is when all operations to the data persistence layer are performed in whole units, and succeed entirely, or fail entirely. If any portion of a request to write or read data fails, the entire request will fail. Consistency means every operation performed upon the data persistence layer must bring the entire data persistence and all global replications to a uniform state. No operations can result in a corrupt state. Isolation means operations can be performed in parallel, and if they are, a data storage layer will reach a same state as if they were performed sequentially. Durability means once an operation is performed, it's effects must remain in perpetuity on all instances of the data layer, until another operation affects a different change. To meet the above requirements, multiple open-sourced datastore software applications may be utilized, such as Postgres and Redis. Each of these datastores can offer different performance and feature tradeoffs and therefore can serve difference purposes. Postgres may serve as a primary long persisting datastore that meets all four of the above requirements. Amazon Web Service's (AWS) Relational Data Store (RDS), a commercialized and managed Postgres, can be utilized. Redis is a "key-value" store that persists data in Memory, versus Hard disk, and accordingly offers extremely fast read/write rates for short-lived scalar data. AWS' Elasticache, a commercialized and managed Redis, can be utilized. Role Base Access Controls used as definition files as described above may be implemented in the data persistence layer, and may be in Postgres procedural language.

The authentication layer comprises application login and sessions which can be implemented using AWS Cognito, a commercialized and managed cryptographic secret and authentication verification service.

The application and logic layer may be implemented in an application layer. Specifically, software application may be in a computer language such as TypeScript—an extension of JavaScript and is deployable on scalable short lived compute instances, called AWS Lamda "functions." In order to scale the software application with minimal manual effort, Lamda functions provide a way to deploy individual Typescript functions, on-the-fly, as requests arrive from end users. The application and logic layer iare responsible for receiving requests for authentication, data, and logic compute from end user client applications. These requests can arrive via different protocols, such as Hyper Text Transfer Protocol (HTTP) and/or WebSockets. Once requests arrive at the application layer, the requests can be answered by the specific Lamda function they have been routed to. These functions may then be configured to (i) apply the user session and determine authentication, (ii) access the Role definition (iii) append it to the request, (iv) compute any require logic, (v) generate and send a Database request in SQL, (vi) retrieve the response, and (vii) respond to the end client request. A second function of the application may include issuing schedule-based events that trigger functions. This can be utilized to issue notifications to end users, computer reports from the database, and other time-based needs. AWS Scheduled Events service can used to invoke specific Lamda functions that fulfill these requests.

The client application layer provides a human-useable interface to the Application Layer. One objective of the client application layer is to provide an easy-to-use Interface, a "User Experience," and translate the actions and input from the users into HTTP requests and Web Socket events, networked to the Application Layer, receive the response and provide feedback and data to the end user. End users may be primarily interacting with the software application on a desktop or laptop devices, and some users will be using Mobile computer devices. In order to maintain platform flexibility of a wide variety of Operating Systems across these devices, it is recommended to implement the software application in web browsers using Hyper-Text Markup Language (HTML) and JavaScript languages. In addition, the software application may utilize open-sourced JavaScript framework, React, to build the interface and network with the Application layer.

FEATURE LIST system block diagram (100)
user (101)
computer system (110)
processing component (111)
I/O component (112)
communication pathway (113)
memory (114)
software program (116)
module (117)

graphical user interface (120; 400)
plurality of modules (200)
training module (210)
evaluation module (220)
reporting module (230)
categorization hierarchy (300)
category (310)
training subject (320a; 320b; 320c)
sub-type (330a; 330b; 330c)
student panel area (410)
student icon (411)
trainee icon (415)
status indicator (416)
first status indicator (417)
second status indicator (418)
task panel area (420)
plurality of task icons (425)
evaluated task (426)
task indicator (427)
group panel area (430)
group icon (435)
score input area (440)
task description (445)
score region (446)
progress bar (450)
flow diagram (500)
generating a training report (600)
training report (610)
training identifier (615)
multidisciplinary (616)
evaluation (620)
evaluation identifier (625)
selections (631)
lesson plan (632)
inputs (633)

What is claimed is:

1. A method of recording evaluations with a graphical user interface, the method comprising:
   displaying a plurality of distinct areas on the graphical user interface wherein at least one of the plurality of distinct areas displays a plurality of trainee icons, each of the plurality of trainee icons being associated with one of more students;
   receiving a first selection of one of the plurality of trainee icons, the first selection comprises a first evaluated trainee;
   upon receiving the first selection of the first evaluated trainee, generating and displaying a plurality of task icons associated with the first evaluated trainee, the plurality of task icons being disposed in a task panel area, the task panel area being one of the plurality of distinct areas of the graphical user interface displayed concurrently with the plurality of trainee icons, and further wherein each of the plurality of task icons associated with the first evaluated trainee corresponds with one of a plurality of tasks performed by the first evaluated trainee;
   receiving a second selection of one of the plurality of trainee icons, the second selection comprises a second evaluated trainee;
   upon receiving the second selection of the second evaluated trainee, generating and replacing the task panel area from the plurality of task icons associated with the first evaluated trainee with a plurality of task icons associated with the second evaluated trainee, wherein the plurality of task icons associated with the second evaluated trainee corresponds with one of a plurality of tasks performed by the second evaluated trainee;
   receiving a selection of one of the plurality of task icons associated with the second evaluated trainee, the selected task icon comprises an evaluated task; and
   populating a score input area upon the selection of both the second evaluated trainee and the evaluated task, the score input area being configured to receive an input score associated with the second evaluated trainee and the evaluated task, the score input area being one of the plurality of distinct areas of the graphical user interface displayed concurrently with the plurality of trainee icons and the task panel area;
   receiving the input score in the score input area; and
   updating one or more databases associated with the second evaluated trainee the evaluated task.

2. The method of claim 1, the trainee icon further comprising a status indicator, wherein the status indicator is configured to display a status based on a percentage of the plurality of tasks completed.

3. The method of claim 1, wherein the plurality of trainee icons comprises one or more group icons and one or more student icons wherein each of the one or more group icons is associated with a plurality of students and each of the one or more student icons is associated with an individual student.

4. The method of claim 3, wherein the plurality of students associated with the one or more group icons comprises each individual student of the one or more student icons.

5. The method of claim 1, wherein the updating of the one or more databases occurs without receiving a submit input.

6. The method of claim 1, wherein the plurality of tasks displayed is dependent on the evaluated trainee selected.

7. The method of claim 1, wherein the score input area, the task panel area, and the at least one of the plurality of distinct areas displaying the plurality of trainee icons each occupy separate portions of the graphical user interface.

8. A computer system comprising a display screen, at least one processor and memory that comprises instructions that, when executed by the at least one processor, cause the at least one processor to perform acts comprising:
   displaying a plurality of distinct areas on the graphical user interface wherein at least one of the plurality of distinct areas displays a plurality of trainee icons, each of the plurality of trainee icons being associated with one of more students;
   receiving a first selection of one of the plurality of trainee icons, the first selection comprises a first evaluated trainee;
   upon receiving the first selection of the first evaluated trainee, generating and displaying a plurality of task icons associated with the first evaluated trainee, the plurality of task icons being disposed in a task panel area, the task panel area being one of the plurality of distinct areas of the graphical user interface displayed concurrently with the plurality of trainee icons, and further wherein each of the plurality of task icons associated with the first evaluated trainee corresponds with one of a plurality of tasks performed by the first evaluated trainee;
   receiving a second selection of one of the plurality of trainee icons, the second selection comprises a second evaluated trainee;
   upon receiving the second selection of the second evaluated trainee, generating and replacing the task panel area from the plurality of task icons associated with the first evaluated trainee with a plurality of task icons associated with the second evaluated trainee, wherein the plurality of task icons associated with the second evaluated trainee corresponds with one of a plurality of tasks performed by the second evaluated trainee;

receiving a selection of one of the plurality of task icons associated with the second evaluated trainee, the selected task icon comprises an evaluated task; and populating a score input area upon the selection of both the second evaluated trainee and the evaluated task, the score input area being configured to receive an input score associated with the second evaluated trainee and the evaluated task, the score input area being one of the plurality of distinct areas of the graphical user interface displayed concurrently with the plurality of trainee icons and the task panel area;

receiving the input score in the score input area; and updating one or more databases associated with the second evaluated trainee and the evaluated task.

9. The system of claim 8, the trainee icon further comprising a status indicator, wherein the status indicator is configured to display a status based on a percentage of the plurality of tasks completed.

10. The system of claim 8, wherein the plurality of trainee icons comprises one or more group icons and one or more student icons wherein each of the one or more group icons is associated with a plurality of students and each of the one or more student icons is associated with an individual student.

11. The system of claim 10, wherein the plurality of students associated with the one or more group icons comprises each individual student of the one or more student icons.

12. The system of claim 8, wherein the updating of the one or more databases occurs without receiving a submit input.

13. The system of claim 8, wherein the plurality of tasks displayed is dependent on the evaluated trainee selected.

14. The system of claim 8, wherein the score input area, the task panel area, and the at least one of the plurality of distinct areas displaying the plurality of trainee icons each occupy separate portions of the graphical user interface.

15. A non-transitory computer-readable data storage medium in a computer system, the non-transitory computer-readable storage medium comprising instructions that, when executed by a processor of the computer system, cause the processor to perform acts comprising:

displaying a plurality of distinct areas on the graphical user interface wherein at least one of the plurality of distinct areas displays a plurality of trainee icons, each of the plurality of trainee icons being associated with one of more students;

receiving a first selection of one of the plurality of trainee icons, the first selection comprises a first evaluated trainee;

upon receiving the first selection of the first evaluated trainee, generating and displaying a plurality of task icons associated with the first evaluated trainee, the plurality of task icons being disposed in a task panel area, the task panel area being one of the plurality of distinct areas of the graphical user interface displayed concurrently with the plurality of trainee icons, and further wherein each of the plurality of task icons associated with the first evaluated trainee corresponds with one of a plurality of tasks performed by the first evaluated trainee;

receiving a second selection of one of the plurality of trainee icons, the second selection comprises a second evaluated trainee;

upon receiving the second selection of the second evaluated trainee, generating and replacing the task panel area from the plurality of task icons associated with the first evaluated trainee with a plurality of task icons associated with the second evaluated trainee, wherein the plurality of task icons associated with the second evaluated trainee corresponds with one of a plurality of tasks performed by the second evaluated trainee;

receiving a selection of one of the plurality of task icons associated with the second evaluated trainee, the selected task icon comprises an evaluated task; and populating a score input area upon the selection of both the second evaluated trainee and the evaluated task, the score input area being configured to receive an input score associated with the second evaluated trainee and the evaluated task, the score input area being one of the plurality of distinct areas of the graphical user interface displayed concurrently with the plurality of trainee icons and the task panel area;

receiving the input score in the score input area; and updating one or more databases associated with the second evaluated trainee and the evaluated task.

16. The computer-readable data storage medium of claim 15, wherein the plurality of trainee icons comprises one or more group icons and one or more student icons wherein each of the one or more group icons is associated with a plurality of students and each of the one or more student icons is associated with an individual student.

17. The computer-readable data storage medium of claim 16, wherein the plurality of students associated with the one or more group icons comprises each individual student of the one or more student icons.

18. The computer-readable data storage medium of claim 15, wherein the updating of the one or more databases occurs without receiving a submit input.

19. The computer-readable data storage medium of claim 15, wherein the plurality of tasks displayed is dependent on the evaluated trainee selected.

20. The computer-readable data storage medium of claim 15, wherein the score input area, the task panel area, and the at least one of the plurality of distinct areas displaying the plurality of trainee icons each occupy separate portions of the graphical user interface.

* * * * *